No. 799,151. PATENTED SEPT. 12, 1905.
R. H. ELKINS.
LUBRICATOR.
APPLICATION FILED OCT. 20, 1904.
3 SHEETS—SHEET 2.
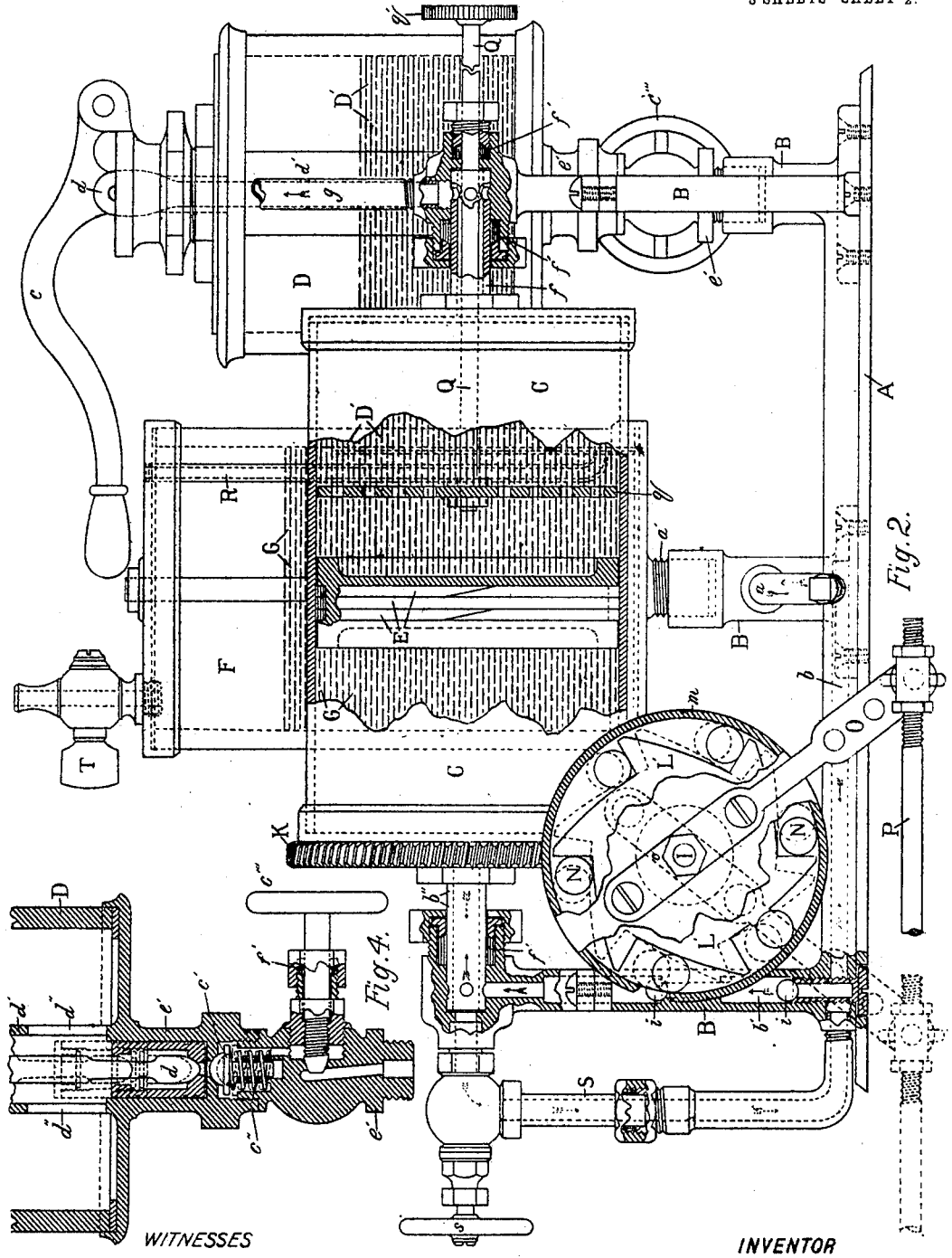
WITNESSES
Alexander Smith
Paul A. Viersen.
INVENTOR
Roland H. Elkins.
BY
H. C. Gardiner
ATTORNEY

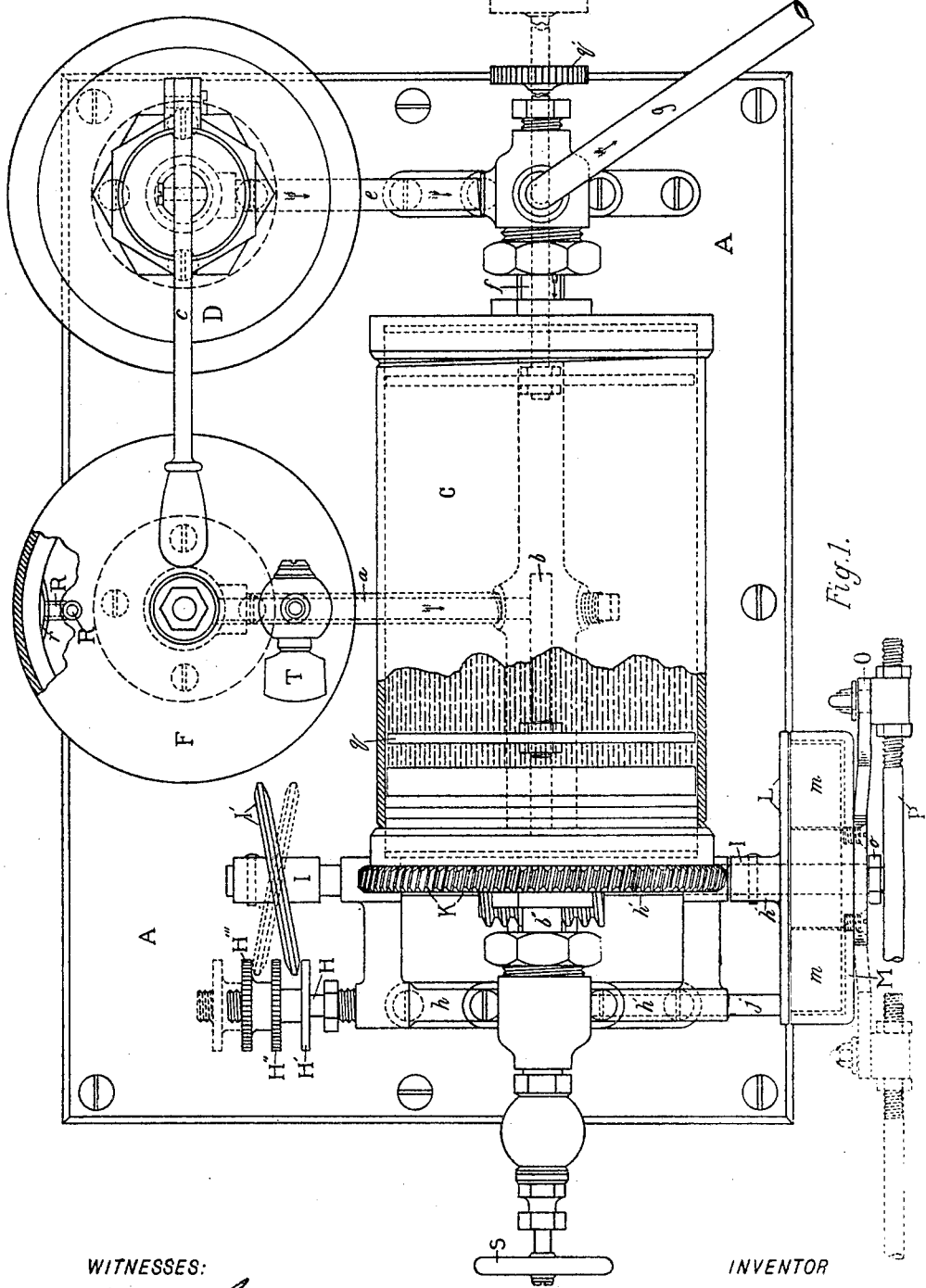

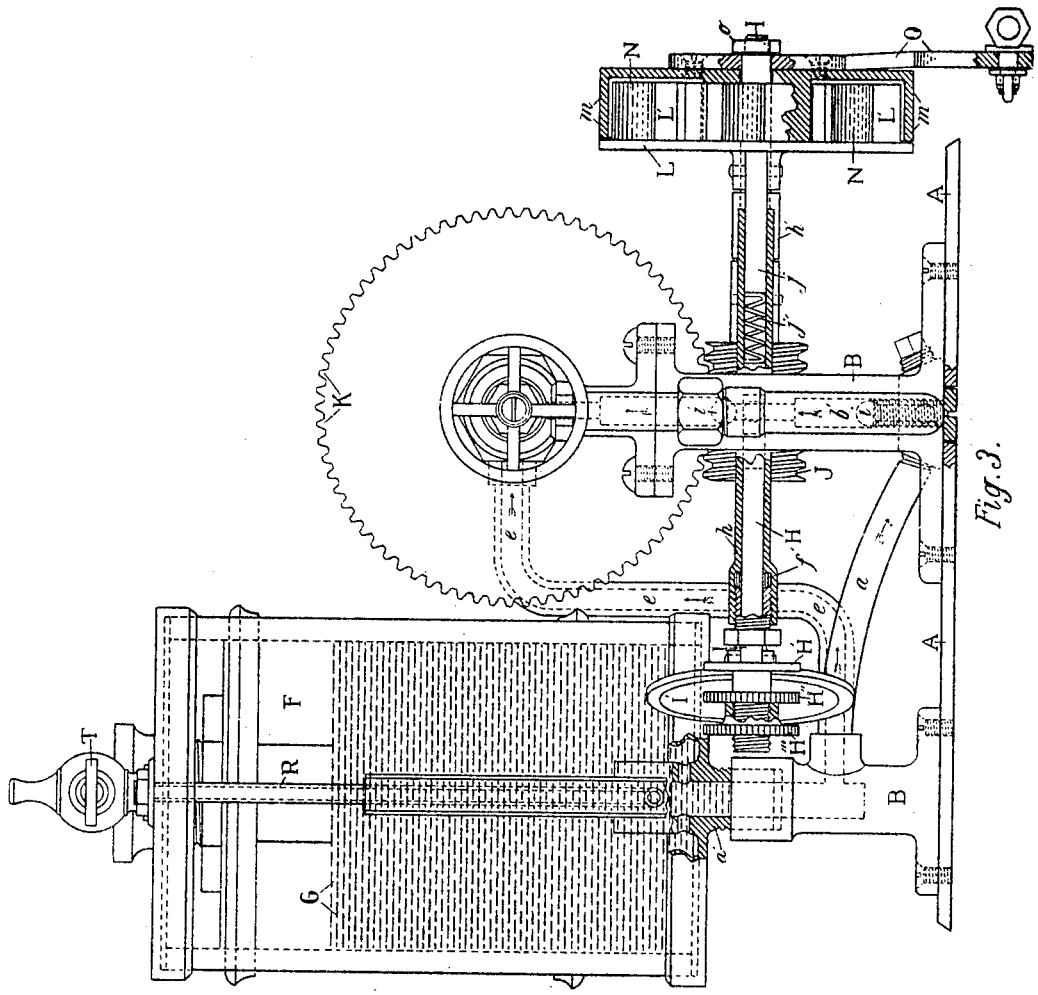

UNITED STATES PATENT OFFICE.

ROLAND H. ELKINS, OF SIOUX CITY, IOWA.

LUBRICATOR.

No. 799,151.      Specification of Letters Patent.      Patented Sept. 12, 1905.

Application filed October 20, 1904. Serial No. 229,258.

*To all whom it may concern:*

Be it known that I, ROLAND H. ELKINS, a citizen of the United States, residing at Sioux City, in the county of Woodbury and State of Iowa, (whose post-office address is Sioux City, Iowa,) have invented a new and useful Improvement in Lubricators; and I do declare the following to be a clear, full, and exact description of the same, reference being had to the accompanying drawings, forming a part thereof.

My invention relates to machines for feeding lubricant; and the object of my invention is to provide means for applying graphite to the lubrication of machinery, especially the cylinders of steam-engines.

As is well known, the practical use of graphite as a lubricant is limited to its combination with some costly chemical preparation or admixture with oil. When mixed with oil, the graphite constantly tends to settle to the bottom of an ordinary lubricant-reservoir, and consequently cannot be properly fed.

My invention provides for a reservoir which holds the graphite when mixed with oil constantly in suspension by continually changing the direction of gravity.

This invention is intended as an improvement upon my lubricating-machine, application Serial No. 132,587, filed November 24, 1902.

I have fully illustrated my invention in the accompanying drawings, in which—

Figure 1 is a plan view, Fig. 2 a view in side elevation, and Fig. 3 a view in end elevation. Fig. 4 is a sectional view of the lower part of the filler or pump.

Some of the parts of the drawings are broken away to afford a view of the inner mechanism.

Similar letters refer to similar parts throughout the several views.

The plate A, which is secured to some stable part of the operating machinery, and the standards B B B, some of which serve also as pipes to convey the lubricant or liquid, as hereinafter described, constitute the framework of the machine. The reservoir or cylinder C is supplied from the chamber of the filler or pump D, which being first filled with lubricant D' forces it out by means of the plunger $d$ and lever $c$ through the pipes $e$, $e'$, and $f$ into the right end of the reservoir. The plunger works in a tube $d'$, which communicates with the chamber of the filler and with the outlet-pipe $e'$ by means of the openings $d''$ $d''$ at the bottom of the tube. A valve $c'$, held in place by a coil-spring $c''$ in the pipe $e'$, prevents the backward flow of the lubricant. The outlet-pipe is also provided with a valve $c'''$, which should be closed when the filler is not in operation.

The lubricant is supplied from the reservoir to the machinery by means of a double-headed plunger E, fitting closely within the reservoir. On one side of the plunger-head is oil, water, or other suitable liquid G, pumped into the reservoir from the supply-can F, thus pushing the plunger-head to the right and forcing the lubricant out through the pipe $f$ and the pipe $g$, which leads to the steam-cylinder or other machinery.

The supply-can communicates with the reservoir by means of the pipes $a$ and $a'$, the latter entering the bottom of the supply-can, the pipes $b$ and $b'$, which pass through the frame and standard, and the pipe $b''$, which with the pipe $f$ furnishes an axis on which the reservoir revolves, the joints being supplied with suitable packing $f'$ $f''$ to prevent leakage. A pump operating in a branch pipe $h$, which communicates with the pipe $b'$, forces the liquid from the supply-can to the reservoir. The pump consists of a pump-rod H, a round ferrule H', thumb-nut H'', and lock-nut H''' at the outer end of the rod. The round balls $i$ $i$, provided with seats in the pipe $b'$, one above and one below the entrance to the branch pipe $h$, serve as valves for the pump-rod. The pump is operated by means of a revolving shaft I, supported in suitable bearings, and near the end of the shaft is secured an angle-wheel I', which, as it revolves with the shaft between the ferrule H' and thumb-nut H'', presses alternately upon the ferrule and the thumb-nut, pushing the rod back and forth, the length of the stroke being regulated by the thumb-nut. A worm-wheel J is secured to the shaft and meshing with a gear K on the left end of the reservoir causes the latter to revolve with the movement of the shaft. The shaft is operated by a combined rim, sprocket and friction wheel at its outer end. A smooth-face wheel L is secured to the shaft, and to the outer face of this wheel is secured the sprocket-wheel L'. A rim-wheel M is adapted to turn freely on the shaft, the rim $m$ encircling the sprocket-wheel. Friction-rollers N N N are inserted between the teeth of the sprocket, the rollers being somewhat less in diameter than the depth of the teeth. An arm O is secured to the outer face of the rim-wheel and is pivotally secured to a reciprocating driver P, connected with the operating machinery. The rim-wheel and arm are adjustably secured to the shaft by the threaded nut o on the threaded end of the shaft I. As the rim-wheel turns in the direction opposite from that toward which the teeth point the rollers on one side of the wheel drop down from the teeth, as indicated in Fig. 2, thus wedging themselves between the outer rim and the inclined plane of the adjacent teeth. The wedging of the rollers is sufficient to turn the shaft, while the backward movement of the arm releases the rollers for another grip. The movement of the machine is thus alternating with complete stops and serves to keep the lubricant mixed, at the same time furnishing sufficient power. An extension $h'$ of the pipe $h$ contains a rod $j$, against the inner end of which presses a coil-spring $j''$, and the outer end of the rod pressing against the face-wheel steadies the latter and prevents any backward movement of the wheel from failure of the rollers to release their grip.

If the machine has stood still some hours, it will be found that the graphite in the lubricant has settled. A means for mixing it before starting the machine is provided in the rod Q, which enters the reservoir through the pipe $f$ and the plunger-head $q$, the opening to the pipe being supplied with packing $f'$. The head of the plunger is filled with perforations, Fig. 2, and to the outer end of the plunger is secured a thumb-nut $q'$. By pulling the plunger back and forth and turning it around the lubricant is thoroughly stirred and the graphite well mixed.

The supply-can is provided with a sight-feed, which is one of the features of this invention. A tube R enters the top of the can and extends along the inside of the can to near the bottom, where it is bent outward and opens into the can. A narrow concave strip of metal $r$ is secured to the lower end of the tube and extends from the bottom of the can up about half the length of the tube between the tube and the circumference of the can, parallel with the latter, the concave surface of the strip facing outward. As liquid is fed from the can the air entering the tube from the top forces itself into the liquid near the bottom of the can and causes a bubble of air to rise to the surface. The rise of air furnishes a true index of the supply of liquid. I have shown the circumference of the can made of glass; but it may be made of metal and a strip of glass inserted opposite the sight-feed. It is necessary to the successful operation of the sight-feed that the supply-can be perfectly air-tight, except for the entrance of the tube.

When the lubricant in the reservoir is exhausted and it is necessary to replenish it from the pump or filler, the liquid is forced out of the opposite end of the reservoir back into the supply-can, where it is again utilized. As the valves $i\ i$ in the pipe $b'$ prevent a backward flow of the liquid, a branch pipe S is provided, which leads around the valves from the pipe $b''$ to the pipe $b$. A valve $s$ at the juncture of the pipes $b''$ and S prevents when closed the liquid from flowing back into the pipe S. When it is desired to send the liquid back into the supply-can, this valve should be open. At the same time the stop-cock T at the upper end of the supply-can should be open to permit the escape of air. In the drawings the arrows show the direct flow of the lubricant and liquid, while the dotted arrows indicate the return-flow.

Having described my invention, what I claim as new, and desire to secure by Letters Patent, is—

1. In a lubricating-machine, a sight-feed device consisting of a supply-can containing liquid, a tube leading into said can from the outer air and opening into the can near the bottom thereof the supply-can being air-tight except for the entrance of said tube, the part of said can opposite said tube being of transparent material, and a strip secured to the lower end of the tube and extending upward therefrom parallel with the transparent part of said can, substantially as described.

2. In a device for feeding lubricant, the combination of a rotatable lubricant-reservoir, means for rotating the same, a movable piston therein, a supply-can containing liquid, means for drawing liquid from said supply-can and forcing it into said reservoir to move said piston against the lubricant whereby the lubricant is discharged therefrom, and a sight-feed device in said supply-can, substantially as described.

In testimony whereof I have hereunto affixed my signature in the presence of two witnesses.

ROLAND H. ELKINS.

Witnesses:
W. F. LOHR,
W. C. HUTCHINS.